United States Patent [19]
Abbott

[11] 4,020,920
[45] May 3, 1977

[54] RETRACTABLE TRANSIT COACH STEP

[76] Inventor: John D. Abbott, 17469 Parker Road, Castro Valley, Calif. 94546

[22] Filed: June 28, 1976

[21] Appl. No.: 700,088

[52] U.S. Cl. .................................. 182/19; 182/91; 182/96; 280/166; 105/445; 105/447
[51] Int. Cl.² .......................................... B60R 3/00
[58] Field of Search ............... 182/91, 95, 96, 19, 182/2; 105/445, 447; 280/166

[56] References Cited
UNITED STATES PATENTS

| 790,195 | 5/1905 | Elkins | 105/445 |
|---|---|---|---|
| 3,039,562 | 6/1962 | Wagner | 182/91 |
| 3,670,849 | 6/1972 | Milner | 182/2 |
| 3,833,240 | 9/1974 | Weiler | 280/166 |

*Primary Examiner*—Reinaldo P. Machado
*Attorney, Agent, or Firm*—Robert R. Tipton

[57] ABSTRACT

A retractable step for mounting on a transit coach utilizes a parallelogram linkage and an hydraulic-pneumatic actuating system which is connected to the movable step member by an off center clevis and lever system to prevent step sagging. Apparatus is provided at the leading edge of the step to immediately stop its outward movement when encountering an immovable object.

3 Claims, 8 Drawing Figures

RETRACTABLE TRANSIT COACH STEP

BACKGROUND OF THE INVENTION

This invention relates generally to movable steps for use on vehicles and in particular to a retractable step employing apparatus to prevent sagging of the step and for preventing injury to passengers and objects when being lowered to its operating position.

Retractable steps for mass-transit vehicles utilizing parallegram linkages for connecting the movable step with the fixed member to maintain a parallel relationship between the vehicle floor and the step have been used in the past, however, the linkages are of necessity connected to the rearward portions of the movable step member when movable step is in the retracted position, the leverage relationship and the amount of play in the linkage connections causes the front end of the step to sag below the level of the bus chassis and be damaged by objects encountered on the road and along the side.

Furthermore, the retractable steps of the prior art failed to allow for immovable objects such as a passenger's leg or the like when being extended into its operable position. Failure to provide for such a situation could cause serious injury to a passenger as well as possible costly damage to the step itself and perhaps to the vehicle at the point of attachment of the step to the vehicle.

SUMMARY OF THE INVENTION

The retractable step of the present invention utilizes a parallelogram linkage system and an actuating system which is connected to the movable step through a clevis member and attached off-center of the point of connection of the linkage member to the movable step to create an upward moment on the front edge of the movable step which prevents sagging and in addition the movable step member is provided with a force detecting means disposed proximate the leading edge of the movable step which is connected to the actuating system, for stopping the forward movement of the step when detecting a force against its leading edge.

It is therefore an object of the present invention to provide a retractable step for a vehicle.

It is a further object of the present invention to provide a retractable step for a vehicle having apparatus for preventing sagging of the leading edge of the movable step when in the retracted position.

It is a further object of the present invention to provide a retractable step for a vehicle incorporating apparatus for preventing injury to passengers when the step is being extended to its operating position.

It is still a further object of the present invention to provide a retractable step for a vehicle utilizing an hydraulic pneumatic actuating system for operating said step.

These and other objects of the present invention will be manifest upon study of the following detailed description when taken together with the drawings.

DESCRIPTION OF THE PREFERRED EMBODIMENT

Figure 1:
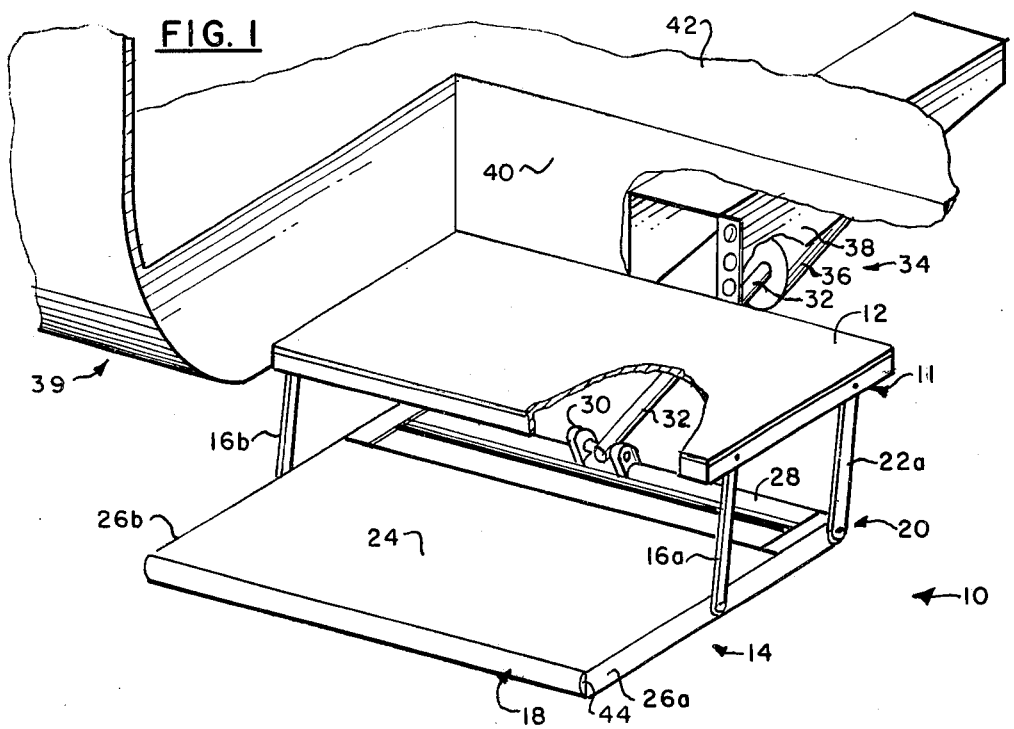
FIG. 1 is an isometric view of the retractable step of the present invention as mounted on a transit vehicle.

With reference to FIG. 1 the retractable step 10 of the present invention comprises, basically, a fixed member 11 which is attached to the underside of a transit coach step 12 and which is also connected to a movable step member 14 by a pair of front linkage numbers 16a and 16b pivotally connected to movable step 14 proximately midway between front edge 18 and rear portion 20 with a pair of linkage members 22a and 22b, which are pivotally connected to said fixed member 11 and said movable step member 14 proximate the rear portion 20 thereof.

Movable step member 14 comprises, basically, a pair of side support members 26a and 26b to which are pivotally connected linkages 16a, 22a and 16b, 22b, respectively, and on top of which is attached tread 24.

A torque tube 28 is attached to side support members 26a and 26b and also has attached to it a clevis member 30 extending upwardly therefrom and to which is pivotally connected piston rod 32 of hydraulic-pneumatic actuator 34. Cylinder 36 of hydraulic-pneumatic actuator 34 is in turn pivotally connected to actuator support member 38 which forms a part of fixed member 11. Actuator support member 38 is also attached to the transit vehicle 39 by means of screws, bolts or the like 34 connected to fixed step riser 40 forming a part of the entry system to vehicle 39 comprising fixed step 12, riser 40 and vehicle floor 42.

Figure 2:
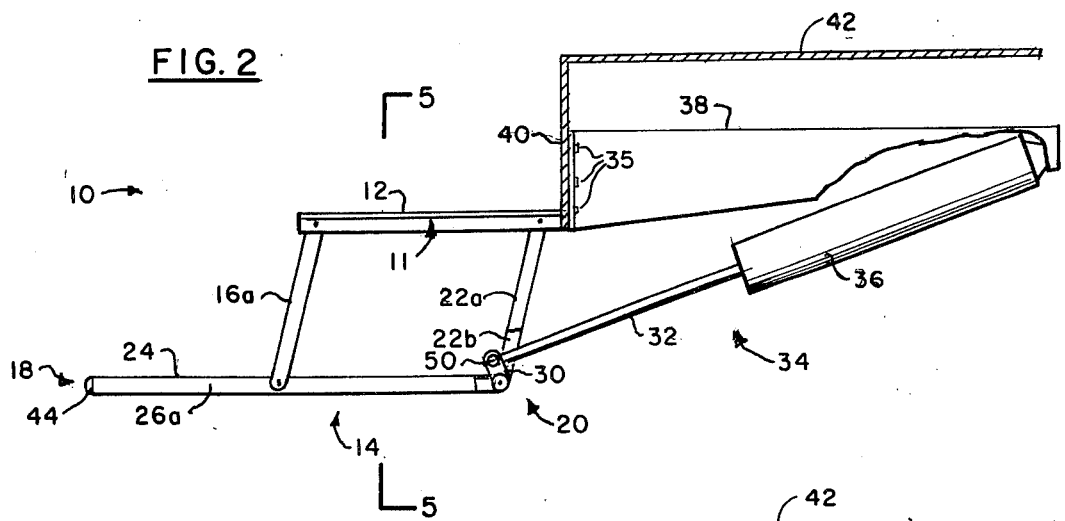
FIG. 2 is a side elevational view of the retractable step of the present invention showing the step in its extended position.
Figure 8:
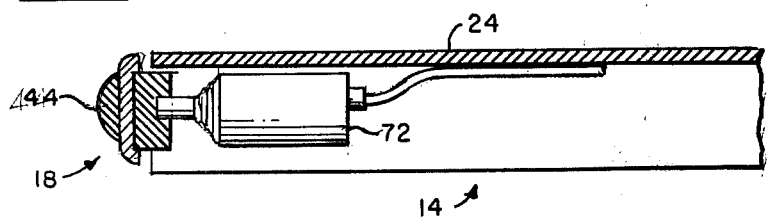
FIG. 8 is a cross-sectional elevational view of the bumper strip and force detecting apparatus of the present invention.

With reference to FIG. 2 the actuating apparatus of the retrractable step 10 of the present invention is shown in greater detail with step 10 shown in the extended position. It will be noted in FIG. 2 the additional feature of bumper strip 44 disposed along the leading edge 18 of movable step member 14 which is shown in greater detail as a cross-sectional view in FIG. 8.

Figure 3:
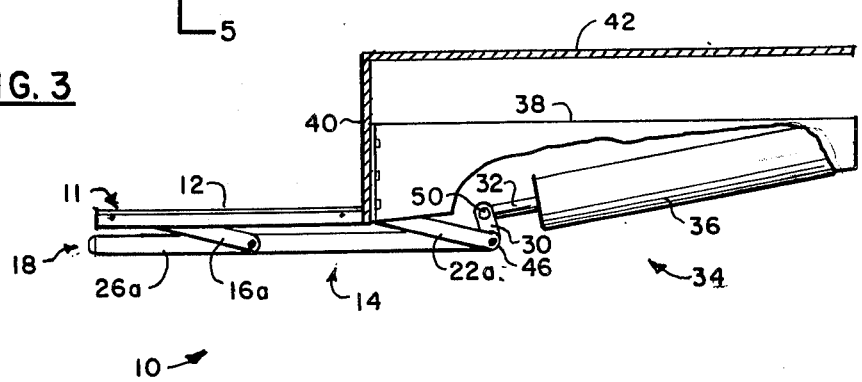
FIG. 3 is a side elevational view of the retractable step of the present invention showing the step in the retracted position.

With reference to FIG. 3 retractable step 10 of the present invention is shown in the retracted position in which piston rod 32 has been drawn into cylinder 36 and a counter-clock wise movement applied to clevis 30 about pivot point 46.

Figure 4:
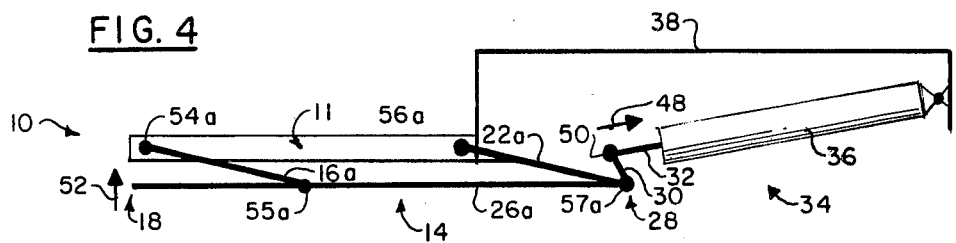
FIG. 4 is a diagramatic, side elevational view of the apparatus of the present invention showing the basic linkage and leverage system for the retractable step of the present invention.
Figure 5:
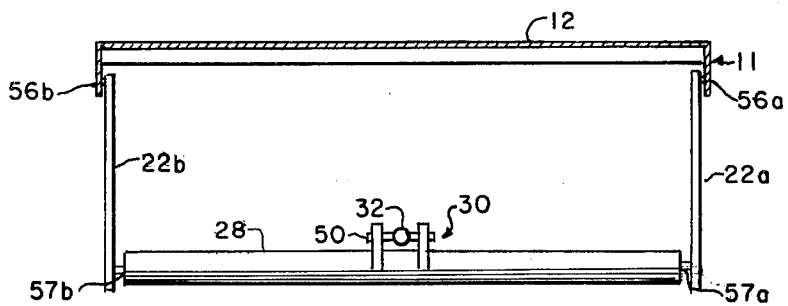
FIG. 5 is a front sectional view of the rear linkage and torque member arrangement of the retractable step of the present invention.

A simplified diagram of the forces and movements is illustrated in FIG. 4 in which the basic components of retractable step 10 of the present invention are shown and comprises, basically, fixed member 11, fixed actuator housing 38, actuating system 34, which is connected to clevis 30, and movable step member 14.

In the retracted position, as shown in FIG. 4, a continuous force in the direction of arrow 48 is applied by piston 32 of actuating system 34 at pivot or rotation point 50 of clevis 30. As was previously described, clevis 30 is fixedly attached to torque member 28 which in turn is fixedly attached to side member 26a of movable step member 14. The rigid unit comprises clevis 30 and side members 26a and 26b which unit is pivotal about pivot 57a. It can be seen that when a force acting in the direction of arrow 48 is applied to pivot 50 of clevis 30, because of the fixed relation between clevis 30 and side members 26a and 26b, an upward moment is applied in the direction of arrow 52 at the leading edge 18 of movable step 14. Thus, in the retracted position, as long as a force in the direction of arrow 48 is applied, leading edge 18 of movable step member 14 will not be permitted to sag due to the play in the bearings of pivots 54a, 54b, 55a and 55b of front linkage members 16a and 16b and pivots 56a, 56b, 57a and 57b of rear linkages 22a and 22b, respectively.

Figure 6:
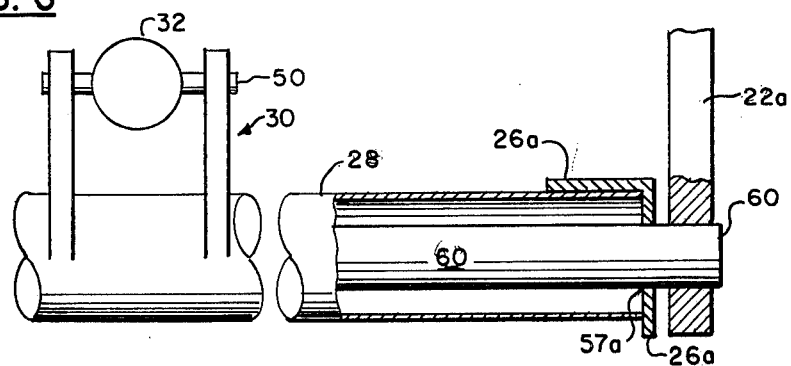
FIG. 6 is a sectional, partial view of the arrangement for the torque bar and pivotal arrangement of the rear linkage member.

The pivot point for rear linkages 22a and 22b can best be seen in FIG. 6 where pivot bearing 57a occurs in side member 26a of movable step 14 and bears upon torque rod 60 which is fixedly connected to both rear linkages 22a and 22b (identical and opposite for linkage 22b).

Thus it can be seen from FIG. 6, by fixedly connecting torque rod 60 to both rear linkages 22a and 22b, any wobble due to the difference in pivoting movement between right linkage member 16a and 22a, and left linkage member 16b and 22b will be eliminated.

Figure 7:
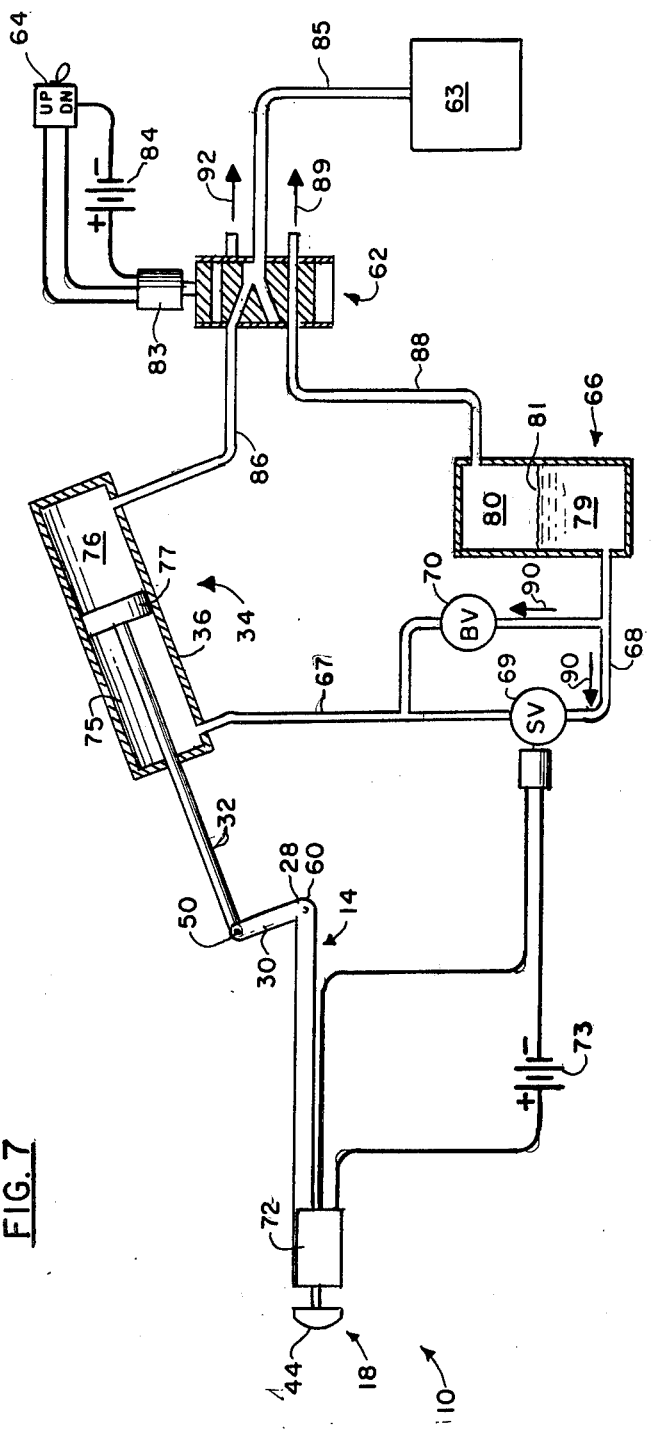
FIG. 7 is a schematic diagram of the actuating and control system for the retractable step of the present invention.

With reference to FIG. 7, there is illustrated the actuating and control system for the retractable step of the present invention which comprises, basically, pneumatic-hydraulic actuating apparatus 34 which is actuated by distribution valve 62 connected to air supply 63 and controlled by switch 64. Distribution valve 62 also controls the flow of air to oil accumulator 66 which is connected to actuating cylinder 36 through conduits 67 and 68, having also connected therein solenoid valve 69 and bypass valve 70. Solenoid valve 69 is in turn connected to microswitch 72 both of which are energized by power supply 73. Microswitch 72 is actuated by bumper strip 44 to close solenoid valve 69 when bumper strip 44 is depressed inwardly. Two such microswitches connected in series may be used, one at each end of bumper strip 44 such that deflecting pressure at either end or at any point in between will be sufficient to actuate the switch.

Actuating cylinder 36 further comprises an oil chamber 75 and an air chamber 76 separated by piston 77 which is connected to and used to drive piston rod 32.

Accumulator 66 further comprises an oil volume 79 and an air volume 80 separated only by oil surface 81. A piston or membrane could be used, however, the friction of such membrane or piston may cause the system to be sluggish in operation.

To operate the apparatus of the present invention, switch 64 is operated or depressed to the "down" position, as shown, to activate solenoid 83 as energized from power supply 84, whereby air from air supply 63 is conducted through conduits 85 and 86 into air chamber 76 of hydraulic-pneumatic actuator 34, driving piston 77 to the left, causing movable step 14 to be moved down and away from fixed member 11 (not shown in FIG. 7) and also causing oil in oil volume 75 to be driven through conduit 67, then through solenoid valve 69, and finally through conduit 68 into oil volume 79 of accumulator 66. Oil surface 81 is thus driven upwardly, forcing air out of air volume 80 into conduit 88, then through distribution valve 62 to the atmosphere, as shown by arrow 89.

Should an object by encountered by bumper strip 44, strip 44 will be forced inwardly against microswitch 72, causing solenoid valve 69 to be energized from power supply 73, thus immediately stopping the flow of oil through conduit 67 into conduit 68, and, in turn, immediately stopping the movement of piston 77 and movable step member 14. As soon as the pressure is released from bumper 44, microswitch 72 is allowed to open, which thus causes solenoid valve 69 to be activated allowing oil to again pass from conduit 67 into conduit 68, again permitting piston 77 to move to the left.

To retract step 10 of the present invention, switch 64 is moved to the "up" position causing solenoid 83 to reverse actuate distribution valve 62, this time allowing air to now pass from air supply 63 through conduit 85 and distribuiton valve 62 into conduit 88 and air volume 80 of accumulator 76, thus driving oil surface 81 downwardly. Oil is thus forced out of accumulator 66 into conduit 68, through solenoid valve 69 and bypass valve 70, as indicated by arrow 90, into conduit 67, and finally into oil chamber 75 of hydraulic-pneumatic cylinder 36, thus forcing piston 77 upwardly to the right and retracting movable step 14 toward actuator 34, upwardly under fixed member 12 (not shown in FIG. 7). As piston 77 moves to the right, air is forced out of air chamber 76 of cylinder 36 into conduit 86, through distribution valve 62 and out to the atmosphere, as shown by arrow 92.

Thus it can be seen that a clockwise moment is applied about torque rod 60 and torque tube 28 to cause leading edge of 18 of movable step member 14 to be maintained in the upward condition.

Also, it can be seen that passenger safety is assured through the use of force sensitive bumper 44 which prevents outward movement of movable step member 14 when encountering a fixed object.

I claim:
1. A retractable step comprising
   a fixed member,
   a movable step member,
   a parallelogram linkage pivotally connecting said movable step member to said fixed member comprising
   a pair of front linkage members pivotally connected proximate the front of said fixed member, and
   a pair of rear linkage members pivotally connected proximate the rear of said movable step member,
   a torque member fixedly attached proximate the rear of said movable step member,
   a clevis fixedly attached to said torque member and depending upwardly therefrom,
   means for moving said movable step member toward and away from said fixed member, having one end of said means connected to said fixed member and the other end of said means connected to said clevis proximate the upwardly depending end thereof, and
   a second torque member fixedly attached to one pair of said parallelogram linkages and pivotally connected to said movable step member.
2. A retractable step comprising
   a fixed member,
   a movable step member, a parallelogram linkage pivotally connecting said movable step member to said fixed member comprising
a pair of front linkage members pivotally connected proximate the front of said fixed member, and
a pair of rear linkage members pivotally connected proximate the rear of said movable step member,
a torque member fixedly attached proximate the rear of said movable step member,
a clevis fixedly attached to said torque member and depending upwardly therefrom, and
an hydraulic-pneumatic actuator having one end connected to said fixed member and the other end connected to said clevis proximate upper end thereof, an air supply,
an hydraulic fluid accumulator,
means for controlling the flow of air to said hydraulic-pneumatic actuator, and
means for controlling the flow of hydraulic fluid to said hydraulic-pneumatic actuator.

3. The retractable step as claimed in claim 2 futrher comprising a bumper strip disposed proximate the front edge of said movable step member, means connected to said bumper strip for detecting a force there against, said means for detecting a force connected to said means for controlling the flow of hydraulic fluid to said hydraulicpneumatic actuator and stopping said flow upon detecting a force against said bumper strip.

* * * * *